United States Patent [19]

Nakata

[11] 3,840,223

[45] Oct. 8, 1974

[54] RECORD CARD FEED DEVICE

[75] Inventor: Kazuhiko Nakata, Shimosuwa-machi, Japan

[73] Assignee: Kabushiki Kaisha Sankyo Seiki Seisakusho, Suna-Gun, Nagano-Ken, Japan

[22] Filed: Mar. 21, 1972

[21] Appl. No.: 236,682

[30] Foreign Application Priority Data

| | | |
|---|---|---|
| Mar. 25, 1971 | Japan | 46-20443 |
| Sept. 16, 1971 | Japan | 46-83437 |
| Sept. 27, 1971 | Japan | 46-87318 |

[52] U.S. Cl.... 271/250, 235/61.11 R, 235/61.11 D, 271/272

[51] Int. Cl. .......... B65h 9/16

[58] Field of Search .......... 271/52, 59, 49, 3, 51, 271/DIG. 9; 235/61.11 R, 61.11 A, 61.11 B, 61.11 C, 61.11 D

[56] References Cited

UNITED STATES PATENTS

| | | | |
|---|---|---|---|
| 2,927,972 | 3/1960 | Del Valle | 226/184 X |
| 3,021,136 | 2/1962 | Fox | 271/51 X |
| 3,084,931 | 4/1963 | Hanson | 271/52 |
| 3,479,491 | 11/1969 | Levine et al. | 235/61.11 H |
| 3,666,262 | 5/1972 | Fowler et al. | 271/52 |
| 3,680,853 | 8/1972 | Houghton | 271/51 X |

OTHER PUBLICATIONS

May, G. H. "Card Handling Drive Means", IBM Tech. Disc. Bulletin, Vol. 13, No. 9, Feb. 1971, p. 2512.

*Primary Examiner*—Richard A. Schacher
*Assistant Examiner*—Bruce H. Stoner, Jr.
*Attorney, Agent, or Firm*—McGlew & Tuttle

[57] ABSTRACT

The device comprises a capstan and a pinch roller co-operating with each other in pressing a record card, placed on a card passageway, against a card guide wall provided on one side of the card passageway while moving the card ahead along the card passageway so that the information recorded on the card magnetically, for example, can be read out by readout means, for example, a magnetic head, disposed in a predetermined position. The capstan has a frustro-conical peripheral surface which is inclined with respect to the axis of the capstan such that its maximum diameter peripheral surface portion is disposed near to the guide wall and, when the maximum diameter peripheral surface portion is brought into pressing engagement with a card held between the capstan and pinch roller, the capstan exerts on the card not only tangentially directed force effective to move the card lengthwise of the card passageway but also an axially directed repulsive force which urges the card to move axially of the capstan into pressing engagement with the card guide wall, whereby the card can move straight ahead without deviating from its predetermined course as in a zigzag movement, which the information on the card is read out by the readout means.

3 Claims, 10 Drawing Figures

RECORD CARD FEED DEVICE

BACKGROUND OF THE INVENTION

This invention relates to a record card feed device.

Record cards, such, for example, as information cards, identification cards, drivers' licenses, railroad season tickets and the like, carry various types of information recorded on them by various means for identification and verification purposes. The information on these cards can be read out either electrically, optically, or magnetically, depending on how the information is recorded on them.

In one type of device for reading out the information carried by such cards, readout means comprising a, photoelectric transducer element or a magnetic head is firmly fixed while each record card is moved relative to the readout means for effecting readout of the information carried by the card.

This type of readout means offers the advantages of being simple in construction, high in readout speed, and accurate and reliable in performance. However, one of the problems encountered in this type of readout means is how to cause each card to move straight ahead without deviating from its predetermined course in a zigzag movement, when it is inserted in the slit.

One may readily think of providing a pair of guide walls disposed on opposite sides of the record card for guiding its movement. However, this arrangement has a disadvantage in that only cards of a size conforming to the spacing between the walls can be handled and that cards of a size greater or smaller than the wall spacing cannot be handled. If the card had a size greater than the wall spacing, it would be stuck on the card passageway.

If a card guide wall is provided on only one side of the card passageway and the card is moved while being pressed against the card guide wall, the card feed operation can be performed smoothly. However, some useful means must be provided for pressing the card against the guide wall while the card is moving along its passageway.

Means for pressing the card against the card guide wall may comprise a spring arranged so that by its biasing force it urges the card against the card guide wall by engaging the card on a side thereof opposite the guide wall. This arrangement is more or less similar to the arrangement in which guide walls are provided on opposite sides of the card passageway. Besides, the use of a spring makes it difficult to exert a uniform pressing force on the card.

Another means for pressing the card against the card guide wall may use a capstan tiltingly supported by an inclined shaft so that a transversely directed force may be produced to urge the card to move toward the card guide wall when the capstan rotates. The provision of the inclined capstan shaft poses a problem hard to obviate in construction and operation of such a capstan.

SUMMARY OF THE INVENTION

An object of this invention is to provide a record card feed device in which a capstan adapted to be driven by a drive source is mounted at an entrance to a card passageway, defined between upper and lower frame members and having a card guide wall disposed at one side thereof, for cooperation with a pinch roller to move a record card along the card passageway, and in which an information readout element and a pressure roller are disposed above and below the card passageway, respectively, so that the latter may move the card upwardly into engagement with the former to permit the information on the card to be read out while the card moves along the card passageway, such capstan having a frusto-conical peripheral surface which is inclined with respect to the axis of the capstan such that a maximum diameter peripheral portion is disposed near to the card guide wall and produces, when it engages the card, a repulsive force directed axially of the capstan which tends to press the card against the card guide wall, whereby the card can be caused to move straight ahead along the card passageway without deviating from its predetermined course in zigzag movement while the information on the card is read out by the readout element.

Another object of the invention is to provide a record card feed device in which a capstan having a frusto-conical peripheral surface which is inclined with respect to the axis of the capstan is made of a soft resilient plastic material, the frusto-conical peripheral surface being capable of undergoing deformation when the capstan engages a record card so that the card can move straight ahead along a card passageway without deviating from its predetermined course in zigzag movement while being urged to move in the direction of deformation into engagement with a card guide wall disposed on one side of the card passageway.

Another object of the invention is to provide a record card feed device in which a pinch roller is juxtaposed to a capstan in such manner that the former is disposed below a card passageway and the latter is disposed above the card passageway, such pinch roller having its periphery formed with a relief in a position which corresponds to a maximum diameter peripheral surface portion of the capstan having a frusto-conical peripheral surface, so that the maximum diameter peripheral surface portion of the capstan can be prevented from undergoing deformation by coming into contact with the periphery of the pinch roller when no card is interposed therebetween.

Another object of this invention is to provide a record card feed device in which a plurality of frame members, including upper and lower frame members, are superposed one above the other to define a card passageway, one of such frame members fixedly supporting a record readout element being adjustably movable relative to the other frame member on which a card guide wall is provided.

Another object of the invention is to provide a record card feed device in which a pinch roller juxtaposed to a capstan is supported by a shaft capable of being moved vertically so as to adjust its vertical position relative to the position of the capstan.

DESCRIPTION OF A PREFERRED EMBODIMENT

Figure 3:
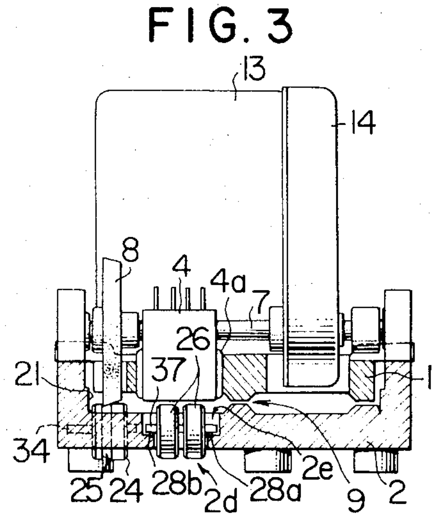
FIG. 3 is a sectional view taken along the line III—III of FIG. 1.

One embodiment of the invention will be described, with reference to the accompanying drawings, for illustrative purpose only. Upper and lower frame members 1 and 2 are fixedly secured to each other by four screws 3 inserted in the frame members at four corners. A record readout element 4, such as for example, a magnetic head, is inserted in an opening 5 formed in upper frame member 1 and secured therein through a pair of holding pieces 4a as shown in FIG. 3. Upper frame member 1 is also formed with slots 1*a* and 1*b* for inserting therein a gear box 14 and a capstan 8, respectively, which are secured to a capstan support shaft 7 as subsequently to be described. Information readout element 4 is adhesively secured in place as shown.

Lower frame member 2 is formed on opposite sides thereof with upright walls disposed along a passage for a record card. Upper frame member 1 is secured to the top surfaces of the walls at four corners thereof.

Figure 7:
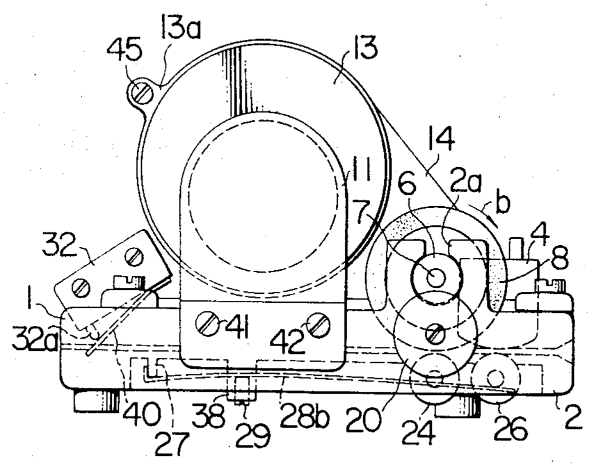
FIG. 7 is a left side view of FIG. 1.

Each wall is formed with a greater height portion in which an opening 2*a* is formed as shown in FIG. 7. Each opening 2*a* mounts therein a bearing 6 for supporting capstan support shaft 7. Bearings 6 are prevented from being dislodged from openings 2*a* by stop plates 20 attached to opposite sides of lower frame 2.

Figure 1:
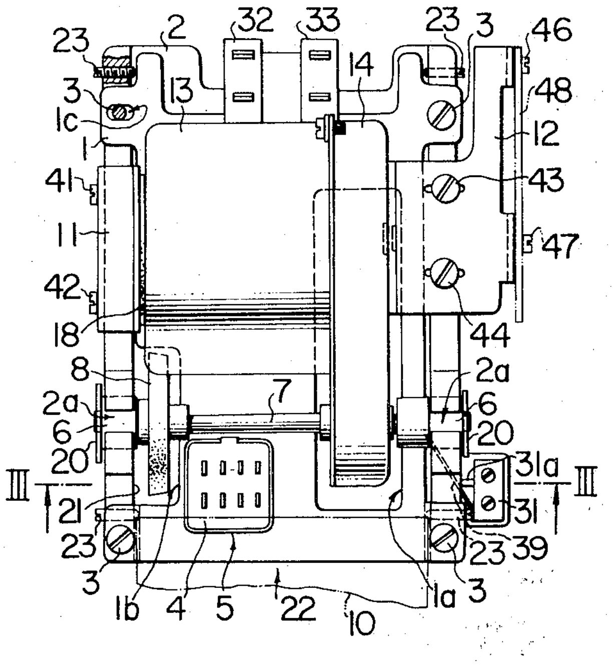
FIG. 1 is a plan view of the record card feed device comprising one embodiment of this invention.
Figure 2:
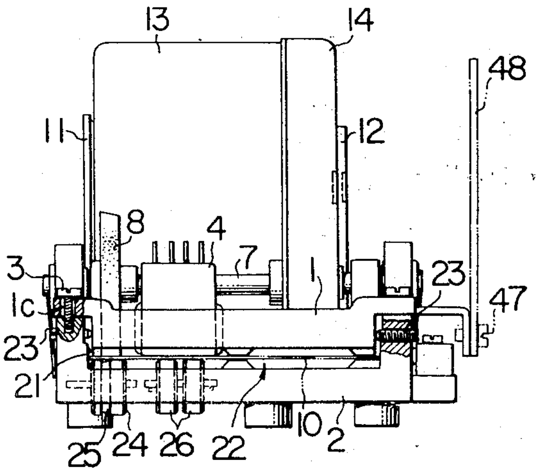
FIG. 2 is a front view of the device of FIG. 1.

The capstan 8 supported as aforementioned by support shaft 7 has an oblique or frusto-conical peripheral surface which is inclined with respect to the axis of the capstan, as shown in FIG. 2 and FIG. 3, and is disposed above an entrance to a record card passageway 9 shown in FIG. 2 and FIG. 3, so that record readout element 4 and capstan 8 can press against a record card 10, inserted in a card inlet slit 22, shown in FIG. 1 and FIG. 2 in broken lines. Readout element 4 can read the information on the card and verify its identity.

Figure 8:
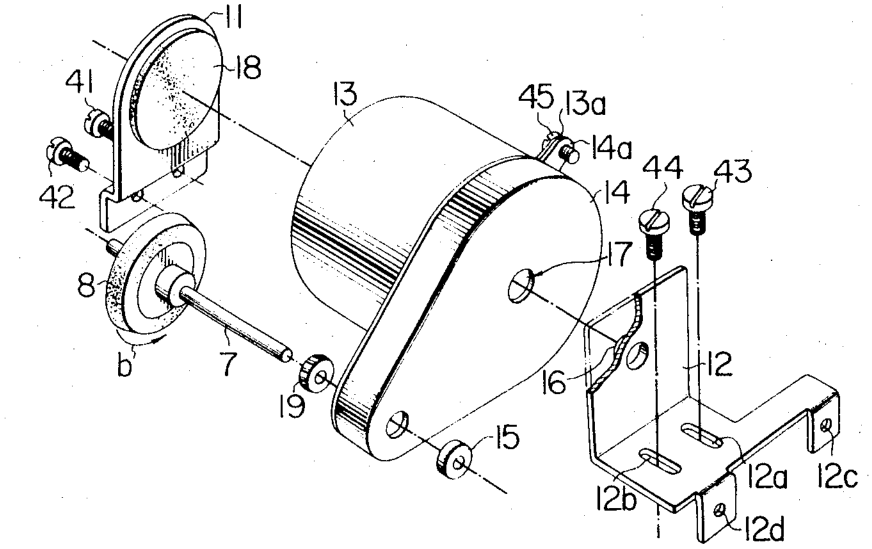
FIG. 8 is an exploded perspective view showing the manner in which the motor is supported.

An electric motor 13 serving as a drive source is supported as shown in FIG. 8 by support plates 11 and 12 secured to lower frame member 2. Rotation of electric motor 13 is transmitted to capstan support shaft 7 through a train of gears housed in gear box 14 with a final gear 19 being secured to capstan support shaft 7.

The train of gears is rotatably supported by gear box 14 secured to an end wall of electric motor 13 and loosely mounted at one portion thereof on capstan support shaft 7 through a bearing 15. Thus, electric motor 13 is supported, for rotation, by capstan support shaft 7 through gear box 14 and caused by a resilient member 18, secured to one support plate 11, to press at one end of the motor against the other support plate 12 being formed therein, as by embossing, a projection 16 adapted to be received in an opening 17 formed in gear box or housing 14 or a cover thereof, so that electric motor 13 as a whole is held against angular rotation about capstan support shaft 7.

In FIG. 8, opening 17 is shown as being aligned with the axis of motor 13. However, the invention is not limited to this arrangement. Support plates 11 and 12 are secured to upper frame member 1 by screws 41, 42, 43 and 44. Support plate 12 is formed with slots 12*a* and 12*b* for receiving screws 43 and 44 which permit the position of the support plate to be adjusted.

One of the upright walls formed on opposite sides of lower frame member 2 as aforementioned, or the wall disposed adjacent capstan 8, is used as a record card guide wall 21 so that its inner surface may guide cards. The position of record readout element 4 relative to the guide wall may be adjusted by varying, with a jig, the relative positions horizontal of upper and lower frame members 1 and 2, or by varying the position of upper frame member 1 horizontally relative to that of lower frame member 2 by adjusting set screws 23 threaded into four corners of lower frame member 2 as shown in FIG. 1 and FIG. 2. The embodiment shown uses the latter means, with screws 3 capable of being threaded into upper frame member 1.

In FIG. 1, slots 1c extending at right angles to the longitudinal axis of upper frame member 1 are formed in the vicinity of screws 23 at four corners of the frame member 1. If screws 3 are loosened and set screws 23 are turned as by a screw driver and moved forwardly or rearwardly, it is possible to effect fine horizontal adjustments of the position of upper frame member 1 relative to that of lower frame member 2. Since the screw and slot arrangement is intended to effect changes in the relative positions of the two frame members, lower frame member 2 may be moved relative to upper frame member 1 by using any suitable means other than the screw and slot arrangement. It is to be understood that the slots 3*c* may be replaced by circular openings having a diameter greater than that of the screws 3 but smaller than that of the heads of the screws 3.

As shown in FIG. 8, the peripheral surface of capstan 8 is inclined with respect to its axis, or frusto-conical such that the diameter of the capstan becomes smaller in going from the left edge of the periphery toward the right edge thereof in the figure. Cooperating with the periphery of a pinch roller 24, the frusto-conical peripheral surface of capstan 8 urges a record card to move toward and into engagement with the inner surface of card guide wall 21 by a repulsive force produced by the capstan so as to cause the card to move straight ahead along the card passageway.

The direction in which the repulsive force is exerted and the magnitude of the repulsive force can be varied by selecting the direction and degree of tilting, or angle, of the peripheral surface with respect to the axis of capstan 8, and its material. Thus, the optimum direction and magnitude of the repulsive force for urging record card 10 toward the card support wall when the card is placed on the card passageway can be determined.

Figure 6:
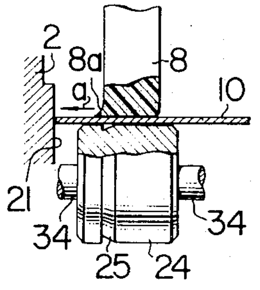
FIG. 6 is a fragmentary sectional view of the device of FIG. 1 showing the manner in which a record card is held between the capstan and pinch roller.

When the frusto-conical peripheral surface of the capstan is made of a soft resilient plastic material, a portion of the periphery of capstan 8 which is brought into engagement with record card 10 is deformed as shown in FIG. 6. The deformation produces a repulsive force directed in the direction of an arrow *a* as shown in the figure, so that record card 10 is urged by the repulsive force to move leftwardly into engagement with card guide wall 21. Thus, record card 10 placed on the card passageway can move straight ahead because it is guided by card guide wall 21 in its movement.

The manner in which capstan 8 engages, at its peripheral surface, record card 10 and urges the same to move by the repulsive force produced by its frusto-conical peripheral surface will be explained with reference to FIG. 9. Capstan 8 will engage record sheet 10 in a region $\alpha$ and rotate in this region while its peripheral surface portion contacting the record card is deformed to produce a tongue-like projection designated 8a as shown in FIG. 6 and FIG. 10. A study of the vertical cross-sectional shape of the maximum diameter peripheral edge portion of capstan 8 at each of the outer limits indicated by perpendiculars $\alpha 1$ and $\alpha 2$ and at the middle indicated by a perpendicular $\alpha o$ shows that the shapes designated A1, A2 and A0 can be obtained at the perpendiculars $\alpha 1$, $\alpha 2$ and $\alpha o$.

Figure 9:
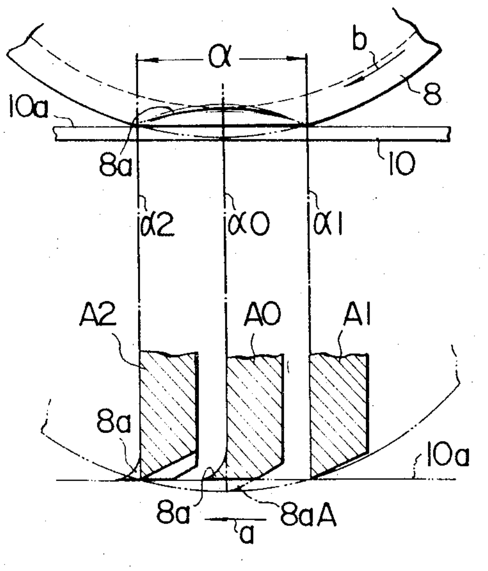
FIG. 9 is a schematic view showing the operation of the capstan in relation to the manner in which the capstan engages a record card.
Figure 10:
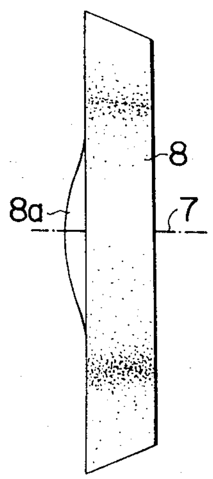
FIG. 10 is a plan view of the capstan showing the manner of its operation.

Capstan 8 continuously rotates in the direction of an arrow *b* in FIG. 9. When its peripheral surface is first brought into engagement with a surface 10*a* of record card 10, the peripheral surface portion in engagement with the record card is deformed into the shape A1, when the peripheral surface is in full engagement with the record card, the peripheral surface portion is deformed into the shape Ao in which the tongue-like projection 8*a* is formed. If the peripheral surface of capstan 8 were of normal shape, it would assume a shape as indicated by a dash-and-dot line 8*a*A. However, the formation of tongue-like projection 8*a* results in a repulsive force directed in the direction of arrow *a* or from the minimum diameter peripheral surface portion toward the maximum diameter peripheral surface portion to be produced by the frusto-conical peripheral surface, so that record card 10 is urged by the repulsive force to move in this direction.

The peripheral surface of capstan 8 is restored to its original shape during its movement from the middle perpendicular $\alpha o$ to the outer limit perpendicular $\alpha 2$. The restoration of shape is caused by the releasing of the peripheral surface of capstan 8 from engagement with the surface of record card 10. When undergoing the restoration of shape, the peripheral surface of capstan 8 does not produce a force which will urge record card 10 to move in an opposite direction.

The aforementioned deformation of the periphery of capstan 8 takes place continuously while capstan 8 is maintained in engagement with record card 10, so that record card 10 is urged to move toward the card guide wall 21 at all times while moving along the card passageway 21. This permits the card to move straight ahead without deviating from its predetermined course in zigzag movement.

When capstan 8 is made of a resilient plastic material as aforementioned, pinch roller 24 is formed in that portion of its periphery which corresponds to the maximum diameter peripheral surface portion of capstan 8 with a relief groove 25 to prevent the peripheries of capstan 8 and pinch roller 24 to come into contact with each other when no record card is interposed therebetween. The provision of relief groove 25 precludes unnecessary deformation of the frusto-conical peripheral surface of capstan 8, thereby preventing its premature permanent deformation.

To avoid engagement of the frusto-conical peripheral surface of capstan 8 with the periphery of pinch roller 24 in the absence of a record card therebetween, means other than the relief groove may be provided. For example, a taper may be formed as shown in dash-and-dot lines at 24C. Alternatively, pinch roller 24 may be displaced from the solid line position shown in FIG. 6 to a broken line position 24A or 24B in which the periphery of pinch roller 24 is not brought into engagement with the peripheral surface of capstan 8 when no record card is interposed therebetween. When this arrangement is incorporated in the device, relief groove 25 need not be formed in the periphery of pinch roller 24.

The relative positions of capstan 8 and pinch roller 24 when the latter are spaced apart from each other as aforementioned will be explained in detail. Capstan 8 and pinch roller 24 are disposed such that, in the absence of a record card interposed therebetween, their peripheries may appear as if they were in contact with each other when one sees the capstan and pinch roller axially thereof toward one or the other end thereof, but their peripheries are actually out of engagement with each other when one sees them in a direction normal to the axis of the capstan because the periphery of pinch roller 24 is not disposed in a vertical plane including the maximum diameter peripheral surface portion of capstan 8 so that the maximum diameter peripheral surface portion of the latter may not be brought into engagement with the periphery of the former.

Figure 4:
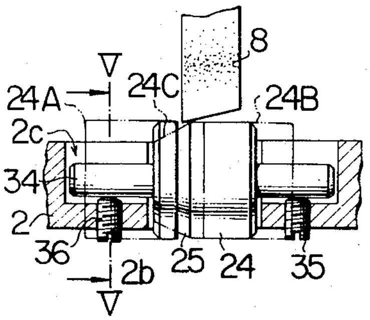
FIG. 4 is a fragmentary sectional view of the device of FIG. 1 showing the manner in which the capstan and pinch roller are disposed in juxtaposed relationship.
Figure 5:
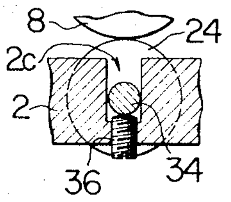
FIG. 5 is sectional view taken along the line V-V of FIG. 4.

Pinch roller 24 is disposed in an opening 2*b* formed in lower frame member 2 and supported by a shaft 34 which is received at opposite ends thereof in grooves 2c contiguous with opening 2*b* as shown in FIG. 4 and FIG. 5. Adjusting screws 35 and 36 are threaded into portions of lower frame member 2 which correspond to grooves 2c. The vertical position of pinch roller 24 can be adjusted by turning adjusting screws 35 and 36.

A pressure roller 26 is provided in an opening 2*d* formed in lower frame member 2 in a position vertically opposite that of readout element 4 with respect to the card passageway. Roller 26 is supported by a shaft 37 which is received at opposite ends thereof in grooves 2*e*, and is adapted to bring record card 10 into engagement with information readout element 4 because its shaft 34 is urged to move upwardly by the biasing forces of leaf springs 28*a* and 28*b* (FIG. 3) connected at one end to a projection 27 formed in lower frame member 2, as shown in FIG. 7, and at the other end to shaft 34.

The force with which roller 26 urges record card 10 to press against record readout element 14 can be adjusted by adjusting a screw 29 threaded into a projection 38 formed on the underside of lower frame member 2 at its middle portion, as shown in FIG. 7.

A switch 31 mounted on one side of lower frame member 2 as shown in FIG. 1 includes an actuator 39 which is pushed and moved by record card 10 as the card is inserted in card inlet slit 22. The movement of actuator 39 results in a pushbutton 31a being depressed to start electric motor 13.

Switches 32 and 33 are mounted on a rear end of upper frame member 1 as shown in FIG. 1. One of the switches is for reversing the rotation of electric motor 13 for reversing the direction of movement of card 10 along card passageway 9. If the leading end of record card 10 presses and moves an actuator 40 of switch 32 to cause a pushbutton 32*a* to be depressed, electric motor 13 will be rotated in the reverse direction to switch from one circuit to the other. The other switch is for switching between circuits for readout element 4.

While card guide wall 21 has been shown and described as being provided on lower frame member 2, it may be provided on upper frame member 1. The information readout element shown and described as being provided on upper frame member 1 may be provided on lower frame member 2.

In FIG. 8, lugs 13*a* and 14*a* are shown as being formed in electric motor 13 and gear box or housing 14 respectively, and connected together by a screw 45. A plate 48 shown in FIG. 1 is threadably secured to motor support plate 12 by screws 46 and 47 inserted in openings 12*c* and 12*d* respectively formed in downwardly bent portions of plate 12, so that control means and other members may be mounted on plate 48.

What we claim is:

1. A record card feed device comprising, in combination, a frame defining a card passage; a record card guide wall extending along one longitudinal side of said card passageway; a capstan formed of a soft resilient plastic material, rotatably mounted in said frame for engagement with a card moving along said card passageway; drive means operable to rotate said capstan at a substantially constant rate; a pinch roller rotatably mounted in said frame and cooperable with said capstan for moving a record card along said card passageway; an information readout element positioned along said card passageway to read out the information on the record card while the latter is moving along said passageway; and a pressure roller rotatably mounted in said frame and engaging a card in the card passageway to press the card into engagement with said information readout element; said capstan having a frusto-conical peripheral surface whose maximum diameter portion is disposed nearer to said card guide wall; whereby, when said frusto-conical peripheral surface of said capstan presses against a card, it exerts a force on the card directed axially of the capstan toward said card guide wall to press the card against said card guide wall; the card thereby being caused to move rectilinearly along said card passageway without a deviation from a rectilinear movement; the periphery of said pinch roller being formed with a triangular cross section relief groove vertically aligned with the larger diameter end of said capstan whereby to prevent contact between said capstan and said pinch roller when no card is feed between said capstan and said pinch roller to preclude unnecessary deformation of the frusto-conical peripheral surface of said capstan to prevent its premature permanent deformation.

2. A record card feeding device comprising, in combination, a frame defining a card passageway; a record card guide wall extending along one longitudinal side of said card passageway; a capstan rotatably mounted in said frame for engagement with a card moving along said card passageway; drive means operable to rotate said capstan at a substantially constant rate; a pinch roller rotatably mounted in said frame and cooperable with said capstan for moving a record card along said card passageway; an information readout element positioned along said card passageway to read out the information on the record card while the latter is moving along said passageway; and a pressure roller rotatably mounted in said frame and engaging a card in the card passageway to press the card into engagement with said information readout element; said capstan having a frusto-conical peripheral surface whose maximum diameter portion is disposed nearer to said card guide wall than its minimum diameter portion; whereby, when said frusto-conical peripheral surface of said capstan presses against a card, it exerts a force on the card directed axially of the capstan toward said card guide wall to press the card against said card guide wall; the card thereby being caused to move rectilinearly along said card passageway without deviation from a rectilinear movement; said frame comprising upper and lower frame members defining said card passageway; one of said frame members mounting said information readout element and the other said frame member having said card guide wall thereon; means operable to adjust horizontally the relative lateral positions of said upper and lower frame members; said frame members being substantially rectangular; and screws threadedly interconnecting said frame members at the four corners thereof; each of said screws being threadedly received in one of said frame members and having its shank extending, with lateral play, through an opening in the other frame member, to provide for relative lateral adjustment of said two frame members.

3. A record card feed device, comprising, in combination, a frame including upper and lower frame members defining a record card passageway therebetween; a record card guide wall on said lower frame member extending longitudinally of one side of said card passageway; a capstan operable in said record card passageway; a shaft supporting said capstan and rotatably mounted in said lower frame member; an electric motor connected to said shaft and operable to rotate said capstan at a substantially constant rate; a pinch roller rotatably mounted in said lower frame member and cooperable with said capstan for moving a record card along said card passageway; an information readout element positioned in said upper frame member along said card passageway to read out the information on the record card while the latter is moving along said passageway; a pressure roller mounted in said lower frame member and engaging a card in the card passageway to press the card into engagement with said readout element; a gear housing secured to one end of said electric motor and supporting a train of gears for transmitting rotation of said electric motor to said capstan support shaft, said train of gears including a final gear fixed to said capstan support shaft; said gear housing being loosely supported by said capstan support shaft and said electric motor and said gear housing being retained between support plates secured to said upper frame member.

* * * * *